United States Patent
Narang et al.

(10) Patent No.: US 9,444,646 B2
(45) Date of Patent: Sep. 13, 2016

(54) METHOD AND SYSTEM FOR WORKGROUP INSTANT MESSAGE

(75) Inventors: Nidhi Narang, Fremont, CA (US); Suneetha Tirumalai, Sunnyvale, CA (US)

(73) Assignee: Unify Inc., Boca Raton, FL (US)

( * ) Notice: Subject to any disclaimer, the term of this patent is extended or adjusted under 35 U.S.C. 154(b) by 1726 days.

(21) Appl. No.: 11/906,028

(22) Filed: Sep. 27, 2007

(65) Prior Publication Data

US 2009/0089371 A1    Apr. 2, 2009

(51) Int. Cl.
| | |
|---|---|
| G06F 15/16 | (2006.01) |
| H04L 12/58 | (2006.01) |
| G06Q 10/10 | (2012.01) |
| H04L 12/18 | (2006.01) |

(52) U.S. Cl.
CPC ........... *H04L 12/581* (2013.01); *G06Q 10/107* (2013.01); *H04L 51/04* (2013.01); *H04L 12/1813* (2013.01)

(58) Field of Classification Search
USPC ........................................................ 709/204
See application file for complete search history.

(56) References Cited

U.S. PATENT DOCUMENTS

| | | | |
|---|---|---|---|
| 6,442,590 B1 * | 8/2002 | Inala et al. ................... 709/204 |
| 6,499,053 B1 * | 12/2002 | Marquette et al. ........... 709/204 |
| 7,512,652 B1 * | 3/2009 | Appelman et al. ........... 709/204 |
| 2002/0029350 A1 * | 3/2002 | Cooper et al. ................ 713/200 |
| 2002/0055973 A1 * | 5/2002 | Low et al. .................... 709/204 |
| 2002/0118809 A1 * | 8/2002 | Eisenberg ................ 379/202.01 |
| 2003/0014489 A1 * | 1/2003 | Inala et al. .................... 709/204 |
| 2003/0028597 A1 * | 2/2003 | Salmi et al. .................. 709/204 |
| 2003/0065721 A1 * | 4/2003 | Roskind ....................... 709/204 |
| 2004/0003041 A1 * | 1/2004 | Moore et al. ................. 709/204 |
| 2004/0019701 A1 * | 1/2004 | McGee et al. ................ 709/250 |
| 2004/0128181 A1 * | 7/2004 | Zurko et al. ..................... 705/9 |
| 2005/0086290 A1 * | 4/2005 | Joyce et al. .................. 709/202 |
| 2005/0086309 A1 * | 4/2005 | Galli et al. ................... 709/206 |
| 2005/0198589 A1 * | 9/2005 | Heikes et al. ................ 715/805 |
| 2005/0223069 A1 * | 10/2005 | Cooperman et al. ......... 709/206 |
| 2006/0111943 A1 * | 5/2006 | Wu ................................. 705/3 |
| 2006/0212519 A1 * | 9/2006 | Kelley et al. ................. 709/206 |
| 2007/0033251 A1 | 2/2007 | Mandalia et al. | |
| 2008/0215506 A1 * | 9/2008 | Annadurai et al. ........... 705/400 |
| 2011/0078270 A1 * | 3/2011 | Galli et al. ................... 709/206 |

* cited by examiner

*Primary Examiner* — Hua Fan
(74) *Attorney, Agent, or Firm* — Buchanan Ingersoll & Rooney PC

(57) ABSTRACT

A method for managing instant message communications, including conducting an instant message (IM) session between a first member of a callable workgroup and an external user participant that calls the callable workgroup; initiating, by the first member of the callable workgroup, a second IM session between the first member and at least one other member of the callable workgroup; and conducting the second IM session between the first member and the at least one other member of the callable workgroup, the at least one other member of the callable workgroup participating in the second IM session capable of monitoring communications of the first IM session between the first member and the external user.

18 Claims, 4 Drawing Sheets

METHOD AND SYSTEM FOR WORKGROUP INSTANT MESSAGE

BACKGROUND

1. Field

Embodiments may generally relate to methods and systems for managing instant messaging. More particularly, some embodiments are concerned with providing a consultation instant message (IM) session in association with a callable workgroup.

2. Description

Telecommunication systems may allow for the grouping of multiple users into a "workgroup". A workgroup may refer to a group of people working together to achieve common business objectives. Workgroups may be formed along organizational divisions and subdivisions within an enterprise.

Conventional IM systems and methods allow a user to participate in an IM session with one or more participants and separately participate with other users in another separate IM session. In order to consult or avail themselves of the input from other users, an IM participant conventionally actively engages in an IM session with all of the participants they seek input from. For example, an IM participant may engage in an IM session with three other users to gather input from the three other users.

As such, there exists a need for a system, method, and computer executable program for managing callable workgroup instant messages, including a consultation IM session.

SUMMARY

Some embodiments provide a system, method, device, program code and/or means to provide a consultation IM session with members of a callable workgroup. In some embodiments, a method may include conducting an instant message (IM) session between a first member of a callable workgroup and an external user participant that calls the callable workgroup; initiating, by the first member of the callable workgroup, a second IM session between the first member and at least one other member of the callable workgroup; and conducting the second IM session between the first member and the at least one other member of the callable workgroup, the at least one other member of the callable workgroup participating in the second IM session being capable of monitoring communications of the first IM session between the first member and the external user.

Some embodiments may include a system for implementing the methods herein. The methods may be implemented using hardware elements, software elements, and combinations thereof. Some embodiments include a medium having machine readable program instructions stored thereon, including instructions to conduct an instant message (IM) session between a first available member of a callable workgroup and an external user participant calling the workgroup; instructions to initiate, by the first member of the callable workgroup, a second IM session between the first member and at least one other member of the callable workgroup; and instructions to conduct the second IM session between the first member and the at least one other member of the callable workgroup, the at least one other member of the callable workgroup participating in the second IM session capable of monitoring communications of the first IM session between the first member and the external user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
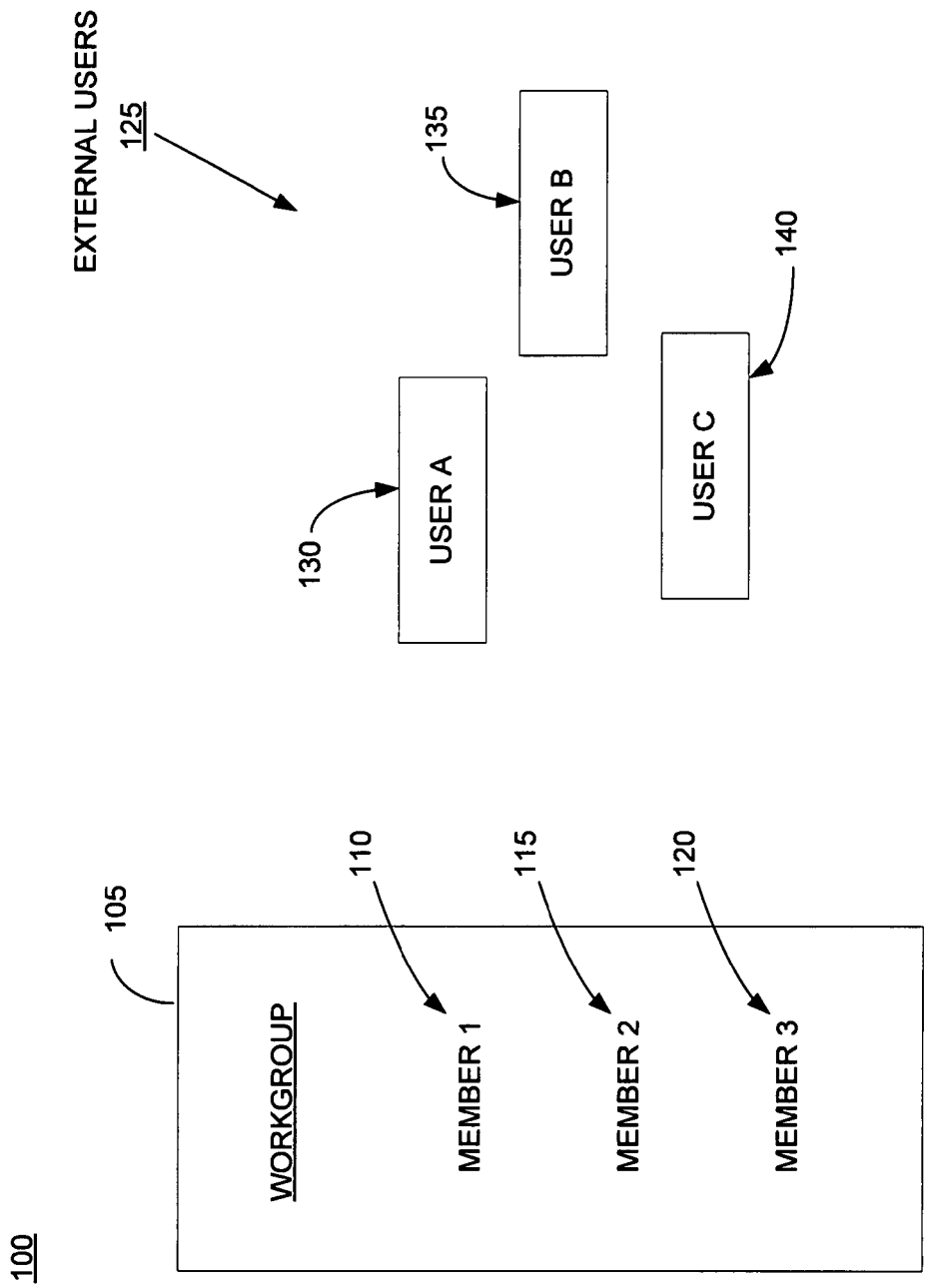
FIG. 1 is an illustration of various instant message, IM, participants, according to some embodiments herein.

FIG. 1 is an illustrative example of instant message (IM) participants 100, according to various aspects and embodiments herein. Two general types of IM participants are depicted in FIG. 1, including a callable workgroup 105 and external users 125. Callable workgroup 105 may include multiple entities that are associated with each other, callable, and governed by a common distribution and contact rule across various media, such as, for example, instant messaging, voice, text messaging, e-mail, fax, video, etc. More generally, a group of users may form a workgroup to, for example, provide a service to other people in an organization. A call to callable workgroup is directed to or placed to the workgroup, as opposed to a call placed to an individual, even if the individual entity belongs to a workgroup.

Callable workgroup 105 is shown as including three members, members 110, 115, and 120. It should be appreciated that the workgroup may include more or fewer members than those specifically depicted in exemplary workgroup 105. In some instances, a member of one workgroup (e.g., 105) may also be a member of another workgroup (not shown).

FIG. 1 also includes a depiction of external users 125 that are not members of workgroup 105. External users 125 include user A (130), user B (135), and user C (140). It should be appreciated that the external users 125 may include more or fewer users than those specifically depicted in exemplary external users grouping 125. The external users are not grouped or otherwise necessarily associated with each.

In one embodiment, workgroup 105 includes members of an organization such as, for example, an IT support team and external users 125 includes IT users external to the organization and seeking the assistance of the IT support team. In an attempt to receive the services rendered by the IT support team an external user A (130) sends an IM to callable workgroup 105. As a consequence of the IM being sent to workgroup 105, an invitation or toast is presented to all members (110, 115, and 120) of the workgroup. In response to the toast, a member of the workgroup may respond to the IM and participate in an IM session with user A (130). In the present example, member 1 (110) is the first member of workgroup 105 to respond to the IM from external user A (130). In some embodiments, when any one member of the callable workgroup responds to the IM to the callable workgroup, the invitation or toast is no longer extended to the other, non-responding members of the callable workgroup.

Figure 2:
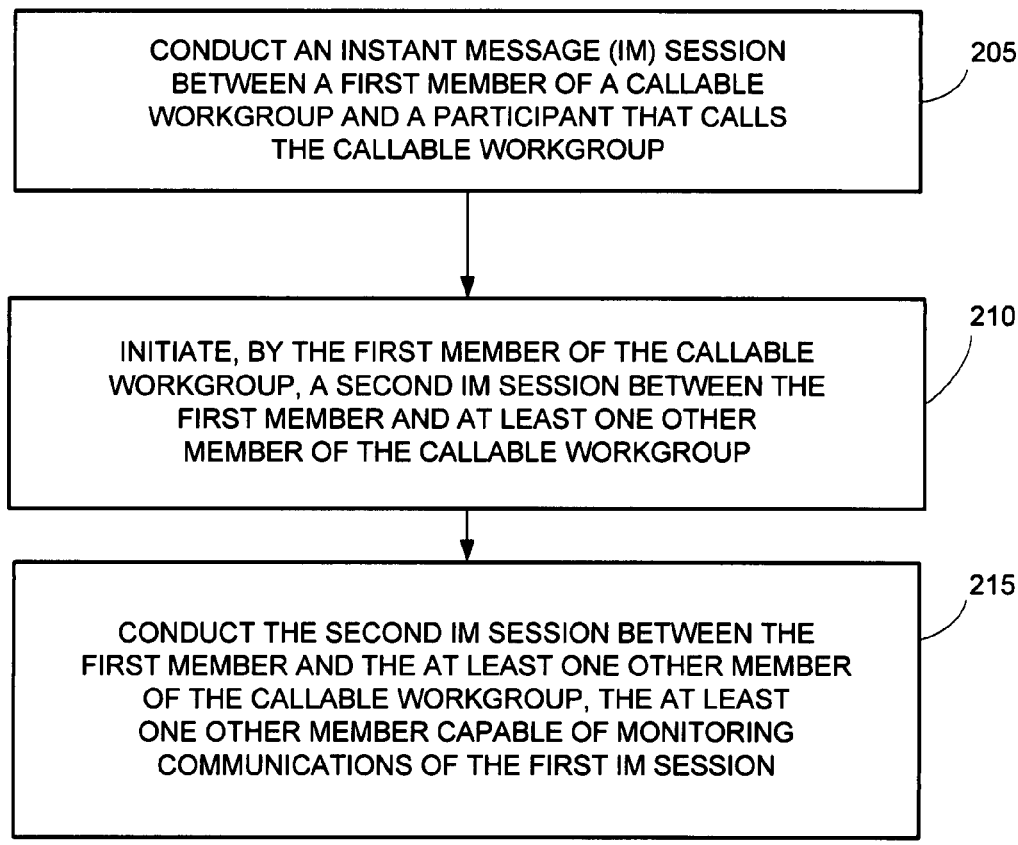
FIG. 2 is an exemplary flow diagram of a process, according to some embodiments.

FIG. 2 is an exemplary flow diagram of a process 200, in accordance with an embodiment herein. Continuing the example above, the IM session between a first member of callable workgroup 105 and the external user that sent the IM is conducted at operation 205. For purposes of this example, it is provided that user A (130) and member 1 (110) participate in the first IM session.

At operation 210, member 1 (110) initiates a second IM session between member 1 (110) and at least one other member of callable workgroup 105. Member 1 (110) may desire to initiate the second IM session with the at least one other member of callable workgroup in order to consult with other members of callable workgroup 105. In some embodiments, other members of workgroup 105 (e.g., member 2 (115) and member 3 (120)) may possess specialized or other knowledge that may be helpful to the first member participating in the first IM session. For example, members 2 and 3 may be able to provide insight to solving a problem presented to member 1 by external user A in IM session 1. Thus, member 1 may initiate or "spawn" the second, consultation IM session to seek the collaborative advice of other members of workgroup 105.

At operation 215, the second IM session is conducted between the first member (member 1) and the at least one other member (members 2 and/or 3) of the callable workgroup 105. It is noted that the at least one other member (members 2 and/or 3) of the callable workgroup 105 participating in IM session 2 may monitor communications of the first IM session. That is, the participant(s) of the second IM session that are not also a participant of the first IM session may monitor the first IM session.

In some embodiments herein, monitoring of an IM session provides a mechanism for those entities monitoring the IM session with the ability to unobtrusively observe or view the communications of the monitored IM session, unbeknownst to the participants of the monitored IM session. For example, the entities monitoring an IM session are able to view the IM conversation between the monitored IM session participants without being participants in the IM session.

Figure 3:
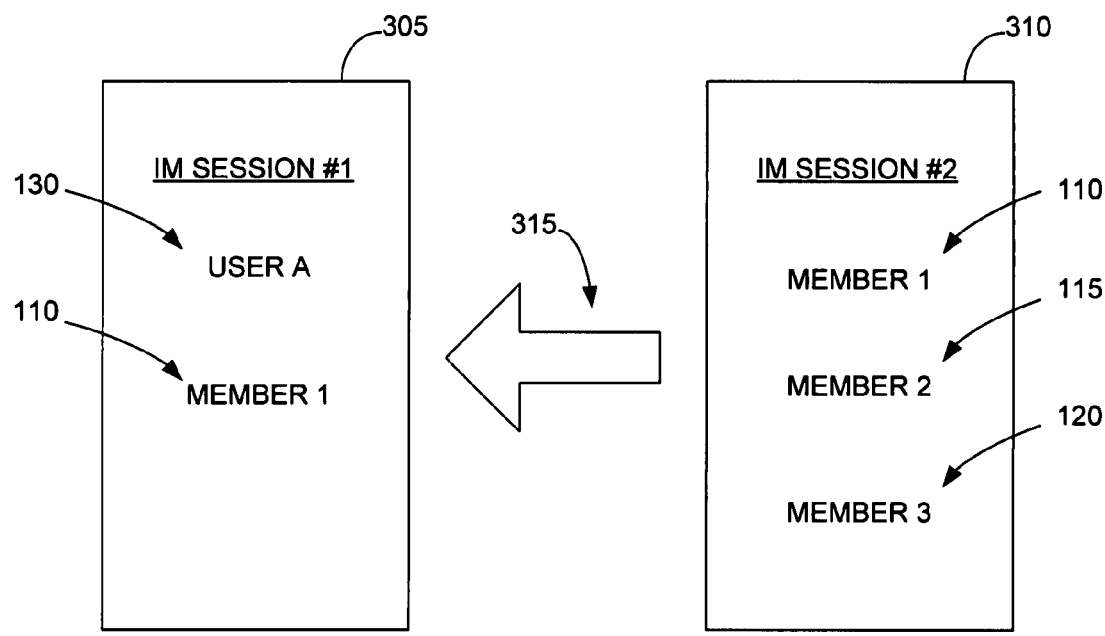
FIG. 3 is an illustrative system, in accordance with some embodiments herein.

FIG. 3 is an illustrative depiction of a system 300, in accordance with embodiments herein. As shown, IM session 305 includes participants 130 and 110, external user A and callable workgroup member 1, respectively. IM session 310 includes participants 110, 115, and 120, members 1, 2, and 3, respectively. That is, IM session #2 includes the callable workgroup member of IM session #1 and other members of the callable workgroup.

In some embodiments herein, the initiation or spawning of the second or consultation IM session may be invoked at the request or manual action of the callable workgroup member participating in the first IM session. In some embodiments, the initiation or spawning of the second or consultation IM session may be invoked automatically based on a rule or other action. For example, the consultation IM session may be automatically invoked upon the participation of a callable workgroup member in an IM session with an external user.

In some embodiments herein, the first and second IM sessions may be conducted simultaneously.

In embodiments herein, a member participating in the consultation IM session may interrupt or otherwise join the first IM session that they are monitoring. This aspect of the present disclosure is illustrated in FIG. 3 by arrow 315 that is representative of a mechanism allowing participants in the consultation IM session (IM session #2) to join the first IM session.

The system of FIG. 3 may include IM session 305 being conducted at a first computing device (e.g., PC, PDA, mobile phone, etc.) and the second IM session being displayed at a second device (e.g., PC, PDA, mobile phone, etc.) It is noted that each of the IM sessions may be provided in a graphical pane, a tabbed interface, and other configurations now known or that become known.

Figure 4:
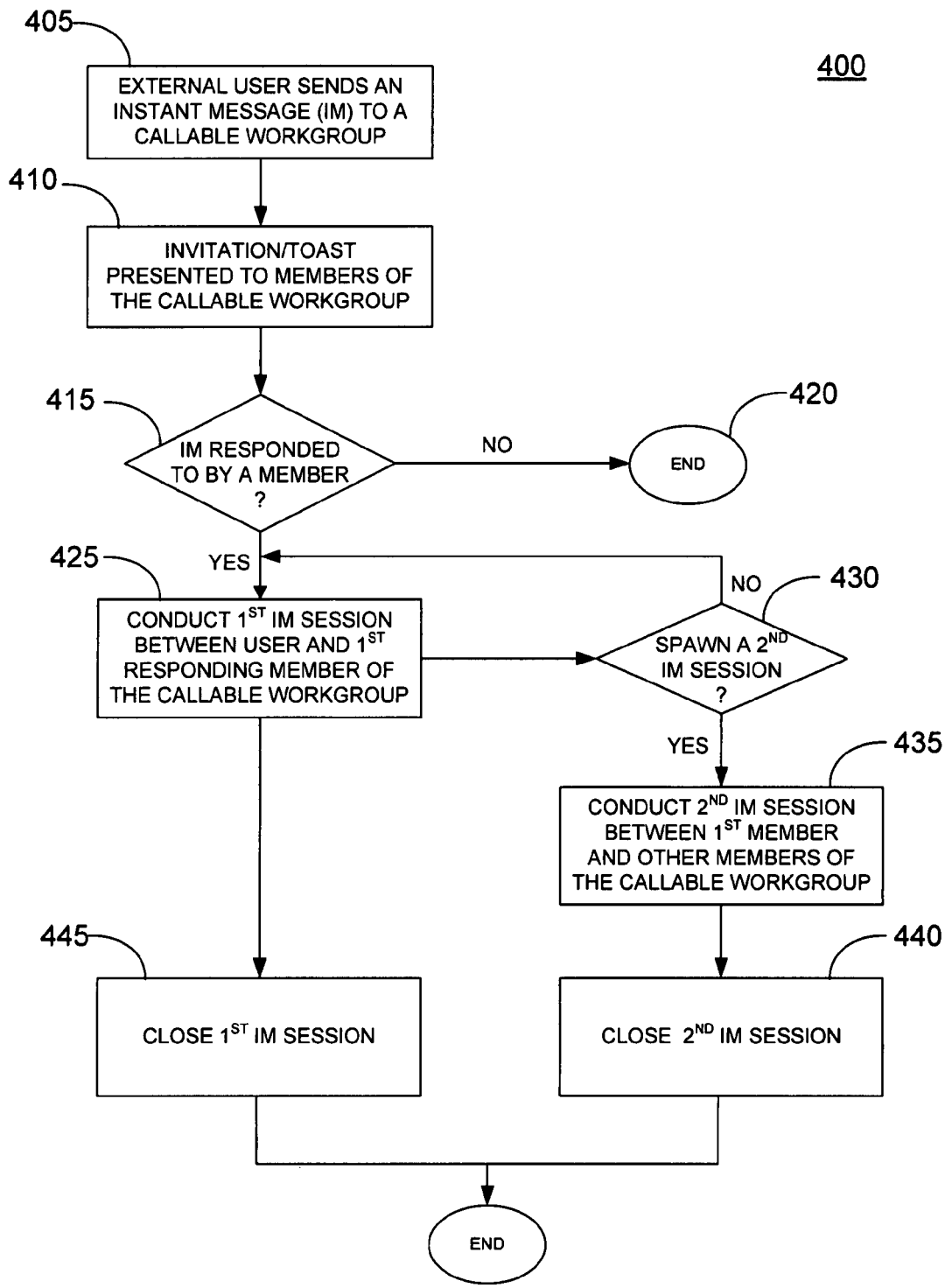
FIG. 4 is an exemplary flow diagram of a process, according to some embodiments.

FIG. 4 is a flow diagram of a process 400, according to some embodiments herein. At operation 405 an external user sends an IM to a callable workgroup. At operation 410 an invitation or toast is presented to members of the callable workgroup.

At operation 415, a determination is made whether a member of the callable workgroup responded to the IM from the external user. If no response is recognized, then the process ends at 420. If a member of the callable workgroup responds to the IM, then process 400 proceeds operation 425.

At operation 425, the first IM session between the responding callable workgroup member and the external user is conducted. The first IM session is conducted until it is ended at operation 445. During the conducting of the first IM session a second IM session may be spawned. A determination is made at operation 430 regarding whether a second, consultation IM session is spawned. If the second IM session is not spawned, then the first IM session is the only IM session that is conducted. If the second IM session is spawned, then the second IM session is conducted at operation 435 between the first callable workgroup member and other members of the callable workgroup. Participants of the second IM session that are not participants in the first IM session may monitor communications of the first IM session. As noted above, the second IM session may be spawned manually or automatically.

The second IM session is conducted until it is ended at operation 440. In some embodiments, when both the first and the second IM sessions are ended, process 400 proceeds to a conclusion.

In some embodiments, the methods and systems disclosed herein may be implemented by a combination of hardware and software components. In some aspects, the methods and systems may be accomplished, at least in part, using computing processors to execute computer code and program instructions stored on a memory (e.g., flash memory, RAM, ROM, disk drive, and other media) or otherwise accessible by the processor.

Embodiments described above are not intended to be limited to the specific forms set forth herein, but are intended to cover such alternatives, modifications and equivalents as can reasonably be included within the spirit and scope of the appended claims.

What is claimed is:

1. A method comprising:
    conducting a first instant message (IM) session between a first member of a callable workgroup, the callable workgroup comprising a plurality of members having the first member and a second member, the first IM session being between the first member of the callable workgroup and an external user participant not a member of the callable workgroup that calls the callable workgroup to initiate the first IM session, wherein the call to initiate the first IM session is directed to all the members of the workgroup;

initiating, by the first member of the callable workgroup, a second IM session between the first member and the second member of the callable workgroup;

conducting the second IM session between the first member and the second member of the callable workgroup, the second member of the callable workgroup participating in the second IM session and not participating in the first IM session for at least a first period of time, the second IM session being separate from the first IM session; and the second member of the callable work group monitoring communications of the first IM session between the first member and the external user via the second IM session.

2. The method of claim 1, wherein the monitoring of communications of the first IM session between the first member and the external user includes the second member of the callable workgroup participating in the second IM session viewing the communications of the first IM session from the second IM session.

3. The method of claim 1, wherein the workgroup also has a third member and wherein the second IM session also includes the third member of the callable workgroup such that the second IM session is between the first member, the second member and the third member.

4. The method of claim 1, further comprising:
presenting an invitation to participate in the first IM session from the external user to the callable workgroup; and
responding first to the invitation by the first member of the callable workgroup such that the invitation for the first IM session is no longer offered to the second member of the callable workgroup.

5. The method of claim 1, wherein the external user of the first IM session is unaware of the second member of the callable workgroup participating in the second IM session monitoring communications of the first IM session between the first member and the external user.

6. The method of claim 1, wherein the first member belongs to more than one workgroup.

7. The method of claim 1, wherein the initiation of the second IM session is done automatically in response to the first member participating in the first IM session with the external user.

8. The method of claim 1, further comprising the second member of the callable workgroup participating in the second IM session and subsequently interrupting the first IM session by joining the first IM session without an invitation to do so to participate in the first IM session, the first period of time being a time extending from a time the second IM session was initiated to a time the second member interrupted the first IM session to join the first IM session without an invitation.

9. The method of claim 1, wherein the first and second IM sessions are conducted simultaneously.

10. A non-transitory medium having program instruction stored thereon, the instructions being executable by at least one computing processor, the medium comprising:
instructions to conduct a first instant message (IM) session between a first member of a callable workgroup and an external user participant not a member of the callable workgroup that calls the callable workgroup to initiate the first IM session, wherein the workgroup is comprised of a plurality of members comprising the first member and a second member and wherein the call is directed to all the members of the workgroup;
instructions to initiate, by the first member of the callable workgroup, a second IM session between the first member and the second member of the callable workgroup; and
instructions to conduct the second IM session between the first member and the second member of the callable workgroup, the second member of the callable workgroup participating in the second IM session and not participating in the first IM session for a first period of time; the first IM session being separate from the second IM session, and
instructions for monitoring such that the second member monitors communications of the first IM session between the first member and the external user via the second IM session.

11. The medium of claim 10, wherein the instructions for monitoring comprises instructions for the second member to view communications of the first IM session via the second IM session.

12. The medium of claim 10, wherein the members of the callable workgroup also comprises a third member, the third member also being involved in the second IM session such that the second IM session is between the first member, the second member, and the third member.

13. The medium of claim 10, further comprising:
instructions to present an invitation to participate in the first IM session from the external user to the all the members of the callable workgroup; and
instructions to respond first to the invitation by the first member of the callable workgroup such that the invitation for the first IM is no longer offered to the second member of the callable workgroup.

14. The medium of claim 10, wherein the external user of the first IM session is unaware of the second member of the callable workgroup participating in the second IM session monitoring communications of the first IM session between the first member and the external user.

15. The medium of claim 10, wherein the first member belongs to more than one workgroup.

16. The medium of claim 10, further comprising instructions to automatically invoke the initiation of the second IM session in response to the first member participating in the first IM session with the external user.

17. The medium of claim 10, further comprising instructions for the second member of the callable workgroup to interrupt and join the first IM session without an invitation to do so to participate in the first IM session, the first period of time extending from a time the second IM session was initiated to a time the second member interrupts the first IM session to join the first IM session without the invitation to join the first IM session.

18. The medium of claim 10, further comprising instruction to conduct the first and second IM sessions simultaneously.

* * * * *